Jan. 17, 1928.  1,656,893

A. B. CLISSON

PRESSING MACHINE

Filed April 13, 1925

INVENTOR.
Albert B. Clisson
BY Parsons & Bordell
ATTORNEYS.

Patented Jan. 17, 1928.

1,656,893

UNITED STATES PATENT OFFICE.

ALBERT B. CLISSON, OF SYRACUSE, NEW YORK, ASSIGNOR TO THE PROSPERITY COMPANY, INC., OF SYRACUSE, NEW YORK, A CORPORATION OF NEW YORK.

PRESSING MACHINE.

Application filed April 13, 1925. Serial No. 22,639.

This invention relates to garment and laundry pressing machines of the platen type and has for its object a pressing machine by which exceptionally large pressing elements can be used to advantage and a work conveyor used for carrying the work to and from between the pressing elements, such conveyor running from the front to the rear side of the frame so that the operator stands in front of the machine to deliver work thereto and receive the finished work therefrom.

The invention consists in the novel features and in the combinations and constructions hereinafter set forth and claimed.

In describing this invention, reference is had to the accompanying drawing in which like characters designate corresponding parts in all the views.

Figure 1:
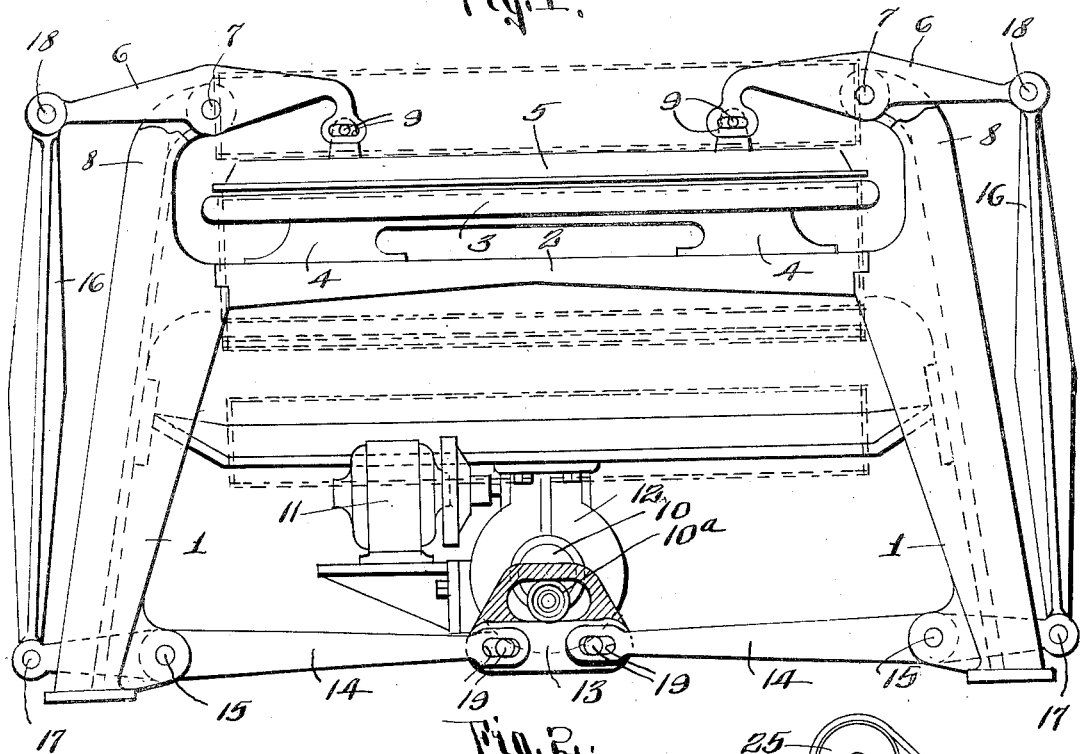
Figure 1 is a front elevation, partly in section of the machine embodying my invention.
Figure 2:
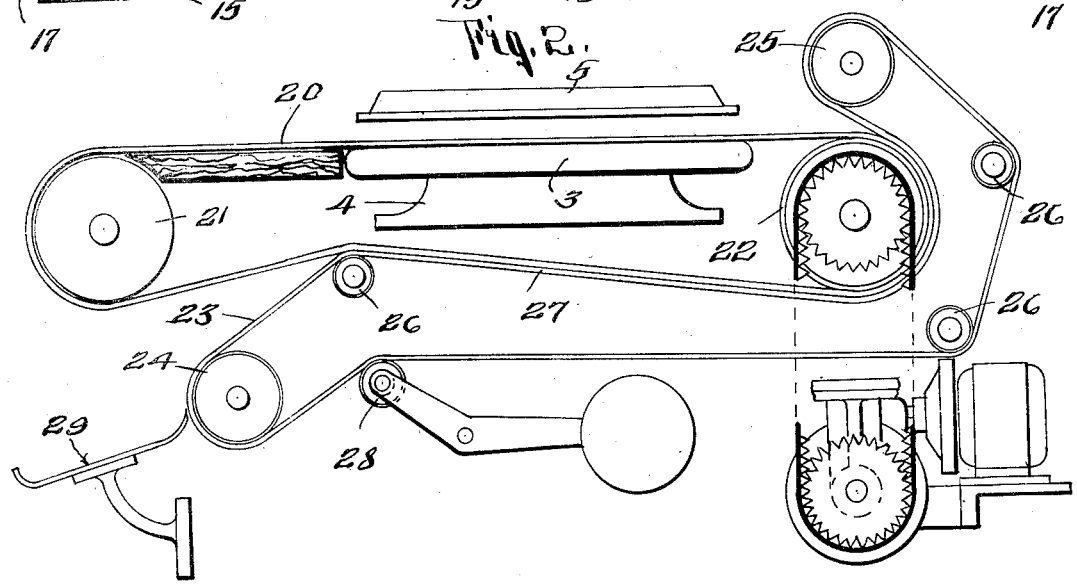
Figure 2 is a fragmentary diagrammatic view of the conveyor mechanism of this machine.

This machine comprises generally a frame, cooperating pressing elements as a buck carried by the frame and a press head movable toward and from the buck, means for supporting and actuating the movable element comprising members connected to different portions as the opposite ends of the head toward the sides of the machine and means common to said members for actuating them.

In addition, the machine preferably embodies a work conveyor movable from the front side of the machine to the rear side and a second work conveyor movable from the rear side to the front side and correlated with the first conveyor to receive finished work therefrom and deliver it to the front side of the machine.

The frame may be of any suitable form, size and construction, it being here shown as comprising opposite legs or standards 1 and a table 2 supported by said standard 1.

3 is a buck mounted on the table 2, it being supported on the table by a suitable bracket 4.

5 is a press head movable toward and from the buck 3. The buck 3 and head 5 are of comparatively large area, as for instance six feet square.

The press is supported by suitable members here shown as levers or yokes 6, each pivoted at 7 between its ends to an extension 8 of one of the standards or legs 1, these levers extending laterally relatively to the frame 1 and each being connected to the head by a joint which permits a rectilinear movement of the head during a pivotal movement of the levers, this joint being here shown as a pin-and-slot connection 9. The means for actuating the levers 6 comprises an actuator common to both of said levers and motion transmitting connections between the actuator and each of the levers 6 and in addition, any power mechanism for operating the actuator.

10 designates the actuator which is here shown as a shaft having a crank or eccentric $10^a$.

The shaft 10 is actuated from a source of power as an electric motor 11 through suitable gearing and a periodic or half revolution clutch located in the casing 12.

The motor is usually constantly running and the clutch is thrown into engaged position by the operator and automatically thrown out after the shaft 10 has made a periodic movement, that is, a half revolution.

The actuating and controlling mechanism for the shaft 10 forms no part of this invention and it is necessary only for an understanding of this invention to bear in mind that the shaft 10 makes in this embodiment of my invention, a complete revolution which causes the press head to open and close.

The connections between the actuator or shaft 10 and each lever 6 as here shown comprises, a cross head 13 having a slot for receiving the eccentric $10^a$, a lever 14 pivoted at 15 between its ends to the lower end of each of the legs 1 and a connecting rod 16 pivoted at one end 17 to the outer arm of the lever 14 and at its other end at 18 to the outer arm of the lever 6. The levers 14 extend laterally in opposite directions from the cross head 13 and are connected thereto by a suitable joint which permits the movement of the ends of the levers 14 in an arc while the cross head 13 is moving vertically in a straight line, this joint being here shown as a pin-and-slot connection 19.

In Figure 1, the press head is shown as closed. To open the press, the shaft 9 is caused to rotate and make one revolution and in so doing the eccentric or roller $10^a$ lifts the cross head 13 and hence lifts inner ends of the levers 14 causing their outer ends to move downwardly and the outer ends of the levers 6 to move downwardly thus raising the inner ends of the levers 6 and press head 5, and then again to push the cross head down to close the press.

During such opening and closing operation, the work conveyor carries one batch of work out from between the pressing elements and a new batch between them.

Owing to this construction, comparatively large pressing elements can be used and pressure applied equally thereto and at the same time the front and rear sides of the machine are unobstructed.

The work conveyor comprises means for conveying the work from the front side of the machine to between the pressing elements and then to the rear side thereof and for returning the pressed work from the rear side of the machine to the front side thereof.

The means for conveying the work to the pressing elements comprises a conveyor belt 20 running over rollers 21 and 22 located respectively in front of the pressing elements and in the rear thereof, the upper run of the belt extending between the pressing elements and the lower run of the belt extending under the buck 3 or between the buck 3 and the table 2.

The means for conveying the finished work forwardly to the front side of the machine comprises a belt 23 running over main rollers 24 and 25 located respectively at the front and rear sides of the pressing elements and suitable guide rollers designated collectively 26. The rollers 24, 25 and 26 are so arranged that the upper run 27 of the belt 23 underlies and is close to the lower run of the belt 20 and also passes around the portion of the belt 20 on the rear roller 22. A suitable idler 28 takes up the slack in the belt 23. Hence the belts are so arranged that the work is carried to the pressing elements in one path and from the elements in a path parallel to the former path but located outside of the space between the elements.

These conveyors are actuated from the shaft 9 and the timing thereof controlled by the clutch within the housing 13. The timing or controlling mechanism forms no part of this invention.

A suitable receiver 29 is located at the front of the machine for receiving the work from the belt 23.

In operation, assuming that the press is closed, the operator places the work on the forward part of the belt 20 in front of the buck 3 and then throws the handle that controls the operation or half revolution of the shaft 10. The machine now being started, the press head opens and the belt 20 moves a sufficient distance to carry the work in between the pressing elements and then the press closes. The operator then arranges a new batch of work on the belt 20 in front of the closed pressing elements and again operates the machine.

Upon the next operation, the head opens and the belt 20 carries the work rearwardly out from between the bucks and the new batch of work in between the pressing elements.

The next operation again closes the head, these operations are repeated and eventually the finished work is carried forwardly between the belts 21 and 23 and delivered to the tray 28.

This machine is particularly advantageous in that a press of the platen type having extra large pressing heads can be used and the operator stands in front of the machine both for the purpose of arranging the work to be pressed and for removing the work after it is pressed.

What I claim is:

1. A pressing machine comprising a frame, a buck supported by the frame, a head movable toward and from the buck, a pair of levers pivoted to the frame and connected to the head to support and actuate it, the levers being independent of each other and pivoted independently of each other to the frame and overhanging the head and means common to both levers for actuating them.

2. A pressing machine comprising a frame, a buck mounted on the frame, a head movable toward and from the buck, the frame including standards extending upwardly above the level of the head, motion transmitting members carried by the standards and arranged above and overhanging the head for supporting and actuating the head, the levers being independent of each other and being pivoted to the standards respectively, and means common to both of said members for actuating them simultaneously.

3. A pressing machine comprising a frame, a buck mounted on the frame, a press head movable toward and from the buck, the frame including spaced apart standards extending above the level of the head and yoke levers pivoted to the standards and connected to opposite ends of the head for supporting and actuating the head, the levers being independent of each other and pivoted to the standards respectively independently of each other, and means common to both yoke levers for actuating them.

4. A pressing machine, a frame including legs at opposite ends of the frame, the legs having upwardly extending standards, a buck mounted on the frame, a head movable toward and from the buck, the standards extending above the level of the head, yoke levers pivoted to the standards and connected to opposite end portions of the head and the levers overhanging the ends of the head and means common to both yoke levers for actuating them.

5. In a pressing machine comprising a buck, a head movable toward and from the buck, means including a lever connected to the head to support and actuate it, the lever being arranged above the level of the head and overhanging the head, in combination with a work conveyor movable from the front side of the head and buck to the rear side thereof.

6. A pressing machine comprising a buck, a head movable toward and from the buck, means including a lever connected to the head to support and actuate it, the lever extending above the head and overhanging the head, in combination with a work conveyor comprising means for carrying the work from the front side of the head and buck to between the same and to the rear side thereof in one path and from the rear side of the head and buck forwardly to the front side thereof in another path located outside of the space between the head and the buck.

7. A pressing machine comprising a buck, a head movable toward and from the buck, means including a lever connnected to the head to support and actuate it, the lever extending above the head and overhanging the head, in combination with a work conveyor comprising means for conveying the work from the front side of the buck and head to between the same to the rear side thereof out from between the same in one path, and from the rear side of the head and buck forwardly to the front side thereof in another path located outside of the space between the buck and the press head and below the same.

8. A pressing machine comprising a buck, a head movable toward and from the buck, means including a lever connected to the head to support and actuate it, the lever extending above the head and overhanging the head, in combination with a work conveyor comprising a belt movable from the front side of the buck to the rear side thereof and rollers over which the belt runs, one run of the belt extending between the buck and the press head and the other run being located outside of the space between the buck and the press head, and an additional belt extending from the rear side of the frame to the front side thereof and rollers over which the latter belt runs, one end of the latter belt being opposed and parallel to the run of the first belt located outside of the space between the buck and the press head and to the portion of the first belt on the rear end on the side of the rear roller of the first belt.

9. A pressing machine comprising a buck, a head movable toward and from the buck, in combination with a work conveyor comprising an endless belt movable from the front side of the buck to the rear side thereof over the face of the buck and having a lower portion running back beneath the buck to the front side thereof and a second conveyor belt contacting with the lower portion of the former belt and movable from the rear side of the buck under the same to the front thereof, and means for actuating the head and the belts.

10. A pressing machine comprising a buck, a head movable toward and from the buck, in combination with a work conveyor comprising an endless belt movable from the front side of the buck to the rear side thereof over the face of the buck and having a lower portion running back beneath the buck to the front side thereof and a second conveyor belt coacting with a portion of the former belt and movable from the rear side of the buck under the same to the front of the buck, means for actuating the head and connections between the actuating means for the head and the belts for actuating them during the opening movement of the head.

In testimony whereof, I have hereunto signed my name, at Syracuse in the county of Onondaga, and State of New York, this 21 day of March, 1925.

ALBERT B. CLISSON.